United States Patent [19]

Lee

[11] 4,046,387
[45] Sept. 6, 1977

[54] DEVICE FOR INDICATING THE PRESENCE OF A GASKET

[76] Inventor: Dalton I. Lee, 900 DeLaird Drive, St. Louis, Mo. 63137

[21] Appl. No.: 723,991

[22] Filed: Sept. 16, 1976

[51] Int. Cl.² .............................................. F16J 15/00
[52] U.S. Cl. .................................. 277/2; 277/DIG. 2
[58] Field of Search ........................ 277/2, 11, 207 A; 285/230, 231, 345

[56] References Cited

U.S. PATENT DOCUMENTS 3,573,871  4/1971  Warner ............................ 277/207 A

*Primary Examiner*—Robert I. Smith
*Attorney, Agent, or Firm*—Lionel L. Lucchesi

[57] ABSTRACT

A plastic pipe system is provided with a device for indicating the presence of a gasket after final system installation. The pipe system preferably is constructed from a suitable plastic material, and includes a first pipe and a second pipe, the second being formed to receive an end of the first pipe along a connection part formed in the pipe. The connection part includes a receptacle sized to receive a suitable gasket. The gasket is inserted in the receptacle and provides a fluid seal between the two pipe ends. The second pipe has an opening formed in a side wall of the pipe defining the gasket receiving receptacle, and an indicator tab is placed through the opening. The tab preferably is attached to or integrally formed with the gasket, and aids in ensuring proper positioning of the gasket in the receptacle. After insertion, the tab permits easy visual inspection of the pipe system, enabling verification of actual gasket presence in the pipe system.

9 Claims, 4 Drawing Figures

DEVICE FOR INDICATING THE PRESENCE OF A GASKET

BACKGROUND OF THE INVENTION

This invention relates to pipe systems, and in particular, to an indicator for ensuring the presence of a sealing gasket in a pipe system, after installation of the system. While the invention is described with particular application in regard to plastic sewer main pipe systems, those skilled in the art will recognize the wider applicability of the inventive principles discussed hereinafter.

Plastic sewer pipe material is available on the market which provides low-cost and easy to install sewer systems. Commonly, the pipe is made in a variety of internal diameter sizes from a suitable polyvinylchloride material or other plastic materials. In one commercially available system, the pipes have a first tapered end, and a second end having an integrally formed bell for receiving the tapered end of the succeeding pipe. The bell has a receptacle, race or groove formed in it, which receives a rubber gasket. When the gasket is properly inserted, the system is an excellent one for a variety of fluid handling applications.

Most local ordinances and building codes prohibit pollution of the soil and water table by unwanted ground and waste water eminating from the sanitary sewer pipe system. Infiltration of surface water within the sanitary sewer system also is undesirable because it overloads sewage treatment plants.

Plastic pipe systems with suitable rubber gaskets are quite capable of preventing both infiltration and exfiltration with respect of the pipe system, provided the gaskets are properly positioned and used. Plastic pipe systems have not achieved their commercial potential for sewage systems, however, because no check was available, prior to my invention, for ensuring the presence of the gasket once the pipe system is installed without costly testing procedures. Plastic pipes normally are opaque. The pipe sections and the gaskets are supplied separately. Consequently, if the field installer decided not to include the gasket in all or part of the system, or if the gasket had been pushed from the gasket race during installation, an inspector attempting to oversee proper installation can not ensure gasket presence by visual inspection. Plastic pipe sewer main sales have suffered as a result of this difficulty.

The invention disclosed hereinafter overcomes this deficiency by providing a quick and inexpensive means for visually inspecting and ensuring the proper placement of gaskets in plastic pipe systems, not only for the benefit of the inspector, but for the installer who wants to be certain of a good installation.

Various means for tagging a gasket in pipe systems are known in the prior art. In general, the prior art devices, while similar in function, are not adaptable to plastic pipe use because of the interconnection form used for joining plastic pipe sections. Plastic pipe is interconnected by sliding one pipe section within another for a relatively long distance. There are no flange joints commonly used in pipe systems constructed from other material. In addition, prior art indicating arrangements generally are expensive to implement, which tends to overcome the cost advantage of plastic pipe systems.

One of the objects of this invention is to provide a low cost device for indicating the presence of a gasket in a pipe seal.

Another object of this invention is to provide means for aiding in proper placement of a gasket.

Another object of this invention is to provide an easy to manufacture gasket present indicating means.

Other objects will be apparent to those skilled in the art in light of the following description and accompanying drawings.

SUMMARY OF THE INVENTION

In accordance with this invention, generally stated, a plastic pipe system having a gasket between successive ones of a plurality of pipes is provided with means for visually indicating the presence and proper placement of the gasket. In the preferred embodiment, the indicating means comprises a tab which projects axially along the axis of the pipe system and extends through the wall of the pipe. The indicating means is designed so that it is self-sealing with the pipe wall, and aids in attaching and positioning the gasket within the pipe system.

DESCRIPTION OF THE PREFERRED EMBODIMENT

Figure 1:
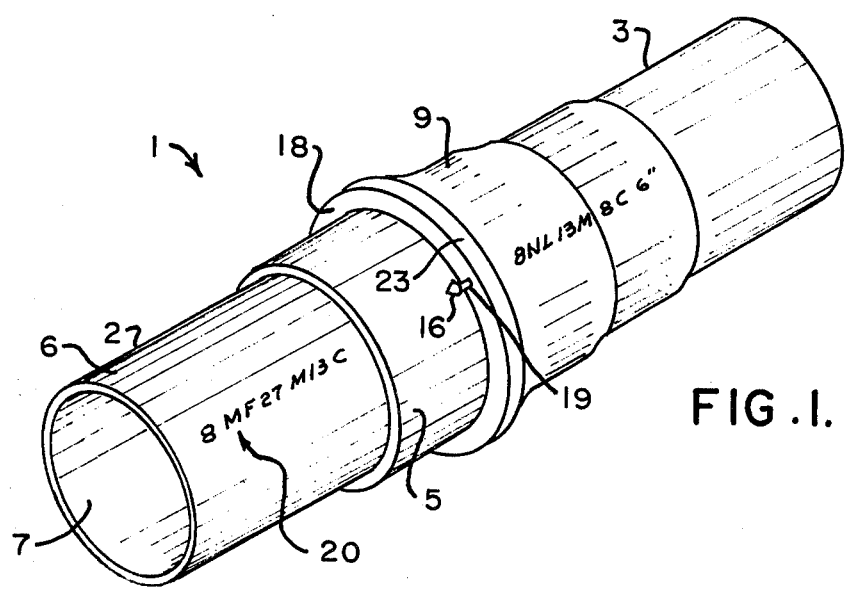
FIG. 1 is a view in perspective of a pipe system utilizing one illustrative embodiment of gasket present indicating means of this invention.

Referring now to FIG. 1, reference numeral 1 indicates a pipe system including a plurality of successive pipes, representative ones of which are indicated by the reference numerals 2 and 3 in FIG. 1.

Figure 2:
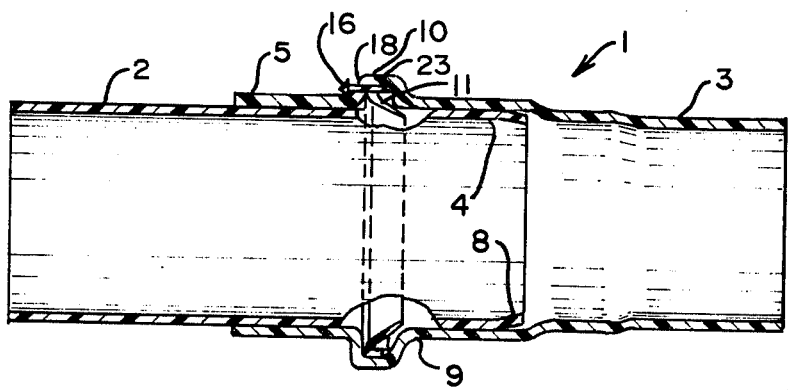
FIG. 2 is a sectional view of the pipe system shown in FIG. 1.
Figure 4:
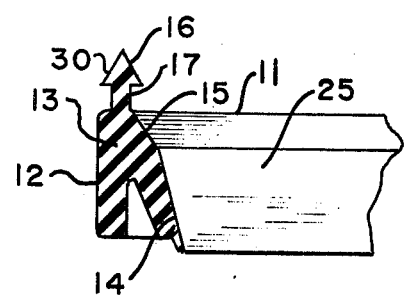
FIG. 4 is a sectional view taken along the line 4—4 of FIG. 3.
Figure 3:
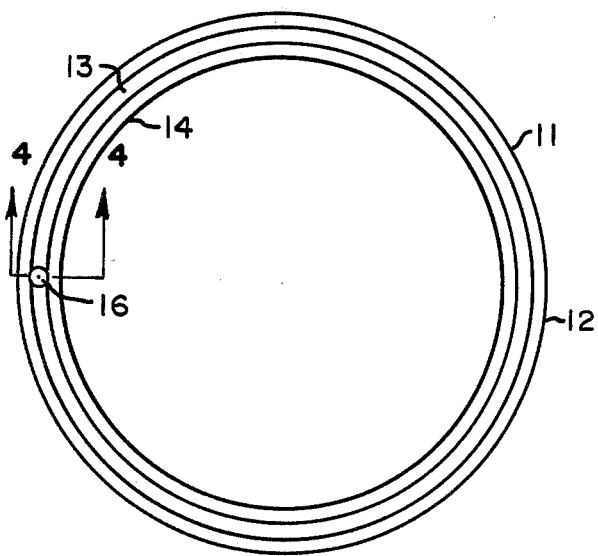
FIG. 3 is a top view of a gasket utilized in conjunction with the pipe system of FIG. 1.

Each of the pipes 2 and 3 are similar to one another, in that each has a first end 4 and a second, bell end 5, sized to receive the end 4 of the preceding or succeeding pipe of the pipe plurality. The ends 4 and 5 are best observed in FIG. 2. Because of pipe similarity, only one of the pipes 2 and 3 is described in detail, like reference numerals being used where appropriate.

Each of the pipes 2 and 3 have an outer wall 6 and an inner wall 7, and a material thickness therebetween. The diameter of the pipes 2 and 3 may vary. For example, six, eight, ten, twelve and fifteen inch diameter pipes commonly are used for sewer main applications.

The end 4 of the pipes 2 and 3 preferably is tapered or is chamfered at 8 to ease the interconnection of the ends 4 and 5 during installation of the pipe system.

The end 5 has a bell or enlarged portion 9 formed in it, which is designed to receive the end 4 of the preceding pipe section. The bell 9 also has circumferential groove 10 formed in it, which is sized to receive a gasket 11. Gasket 11 is conventional, generally being an annular device having a radially outward surface 12 which abuts the groove 10 in the mounted position of the gasket. An end 13 of the gasket 11 has an arm 14 extending radially inwardly from an annular lip area 15 of the gasket. The arm 14 is chamfered at 25 so that the end 4 of the pipe may pass through the gasket 11. As observable in FIG. 2, insertion of the end 4 of the pipe forces the arm 14 radially outwardly, compressing the gasket within and against the groove 10.

An indicator means 16 is attached to the lip 15 of the gasket 11. Indicator means 16 includes a shank portion 17 having a first end attached to the lip 15, and an enlarged second end 30. The indicator means 16 may be integrally formed with the gasket 11, or it may be constructed separately and attached thereto by any convenient method. When constructed separately, attachment to the gasket 11 may be accomplished by suitable adhesives or epoxy substances, for example.

The groove 10, in the embodiment shown, has a side wall 18. The wall 18 has an opening 19 formed in it by any convenient method. The opening 19 may be drilled in the groove 10, or it may be placed in the groove during manufacture of the plastic pipe. In any event, the opening 19 is sized to receive the shank 17. Insertion of the shank 17 within the opening 19 holds the gasket 11 within groove 10, and insures that the gasket 11 is positioned properly within the groove.

It is conventional, in the manufacture of plastic pipe, to identify the pipe by some suitable code 20. The code 20 is placed on the outer wall 6 along each end of the pipe. The codes 20 of the successive pipes 2 and 3 are aligned during installation of the pipe system so that they may be observed by an inspector after pipe system installation but before any backfill operation to bury the system is conducted. I find it advantageous to place the opening 19 in the side wall 18 so that it aligns with the code 20 of the respective pipes 2 and 3. Consequently, the indicator means 16 extends axially of the centerline of the pipe system 1, and always will be observable by an inspector after pipe system 1 installation.

Operation and use of the indicator means 16 is relatively simple. The gasket 11 is installed in its normal way, except that the enlarged end 30 is placed through the opening 19, which locks the gasket in position once the end 30 passes through the opening 19. Thereafter, the pipe ends are joined to one another in a conventional manner. Insertion of the end 4 of one of the pipes 2 and 3 within the end 5 of the other of the pipes 2 and 3 forces the wall 12 and the lip 15 against the groove 12, and seals the shank 17 within the opening 19. Thereafter, presence of the gasket 11 easily is checked simultaneously with the visual inspection of the codes 20, since each of the indicator means 16 is aligned with the code 20 of each pipe.

Numerous variations, within the scope of the appended claims, will be apparent to those skilled in the art in light of the foregoing description and accompanying drawings. Thus, the design silhouette of the indicating means 16 may be varied in other embodiments of this invention. Likewise, the location of the indicating means 16 with respect to the gasket 11 and to pipes 2 and 3 may be varied. Thus, the indicator means 17 may be positioned along the outer surface 12 of the gasket 11, and passed through an opening in a top wall 23 of the groove 11. This arrangement is less advantageous then the embodiment described because the indicator means is more difficult to observe after installation, assuming indicator means size and shape remain constant. Although the indicating means is required because of the unique problems associated with plastic pipe adaption to sewer systems, those skilled in the art will recognize that the invention may be utilized with other pipe systems. These variations are merely illustrative.

Having thus described the invention, what is claimed and desired to be secured by Letters Patent is:

1. In a plastic pipe system including a first pipe, a second pipe, said second pipe having a first end formed to receive an end of said first pipe, said first end having a groove formed in it for receiving a gasket for sealing the joint between said first and said second pipes, the improvement comprising means for indicating proper placement and presence of the gasket after joining of said first and said second pipes, said gasket present indicating means comprising a tab extending axially outwardly from said gasket, said second pipe having an opening in it along said groove for permitting passage of said tab, said tab extending in a direction generally parallel to the axis of said first and said second pipe.

2. The system of claim 1 wherein said first and said second pipes have an indicating code system arranged linearly along it, said tab being aligned with said code system.

3. The improvement of claim 1 wherein said tab has an enlarged end.

4. The improvement of claim 3 wherein said tab is constructed from the same material as said gasket.

5. The improvement of claim 4 wherein said tab is integrally formed with said gasket.

6. In a pipe system including a first pipe, a second pipe, said second pipe having a first end formed to receive an end and a predetermined length of said first pipe, said first end having a groove formed in it for receiving a gasket for sealing the joint between the first and said second pipes, the improvement comprising means for indicating proper placement and the presence of said gasket after joining said first and said second pipes, said gasket present indicating means comprising a tab extending outwardly from said gasket, said second pipe having an opening in it along said groove for permitting passage of said tab, said tab being visible after installation of said pipe system.

7. The improvement of claim 6 wherein said first and said second pipes have an indicating code system arranged linearly along it, said tab being aligned with said code system.

8. The improvement of claim 7 wherein said tab has an enlarged end.

9. The improvement of claim 8 wherein said tab is constructed from the same material as said gasket.

* * * * *